means for said male coupling member, said male coupling member comprising arcuate rib portions located between said parallel passages, a portion of the walls of said male coupling member forming a sector of the walls of said parallel passages, said arcuate rib portions arranged to be inserted in said access means of the adjacent cylindrical section and rotated into locking engagement with said arcuate, undercut grooves to couple said cylindrical sections and align the respective sets of parallel passages, whereby upon insertion of tubular members through said aligned parallel passages said cylindrical sections are prevented from relative rotation tending to uncouple said well tool sections.

References Cited by the Examiner

UNITED STATES PATENTS

| | | | |
|---|---|---|---|
| 912,233 | 2/1909 | Dismuth | 285—376 |
| 1,065,233 | 6/1913 | Gittinger | 285—130 |
| 2,950,761 | 8/1960 | Brown. | |
| 2,999,543 | 9/1961 | Myers | 166—189 |
| 3,094,168 | 6/1963 | Myers. | |

FOREIGN PATENTS 124,826  12/1944  Australia.

CARL W. TOMLIN, *Primary Examiner.*

R. GIANGIORGI, *Assistant Examiner.*

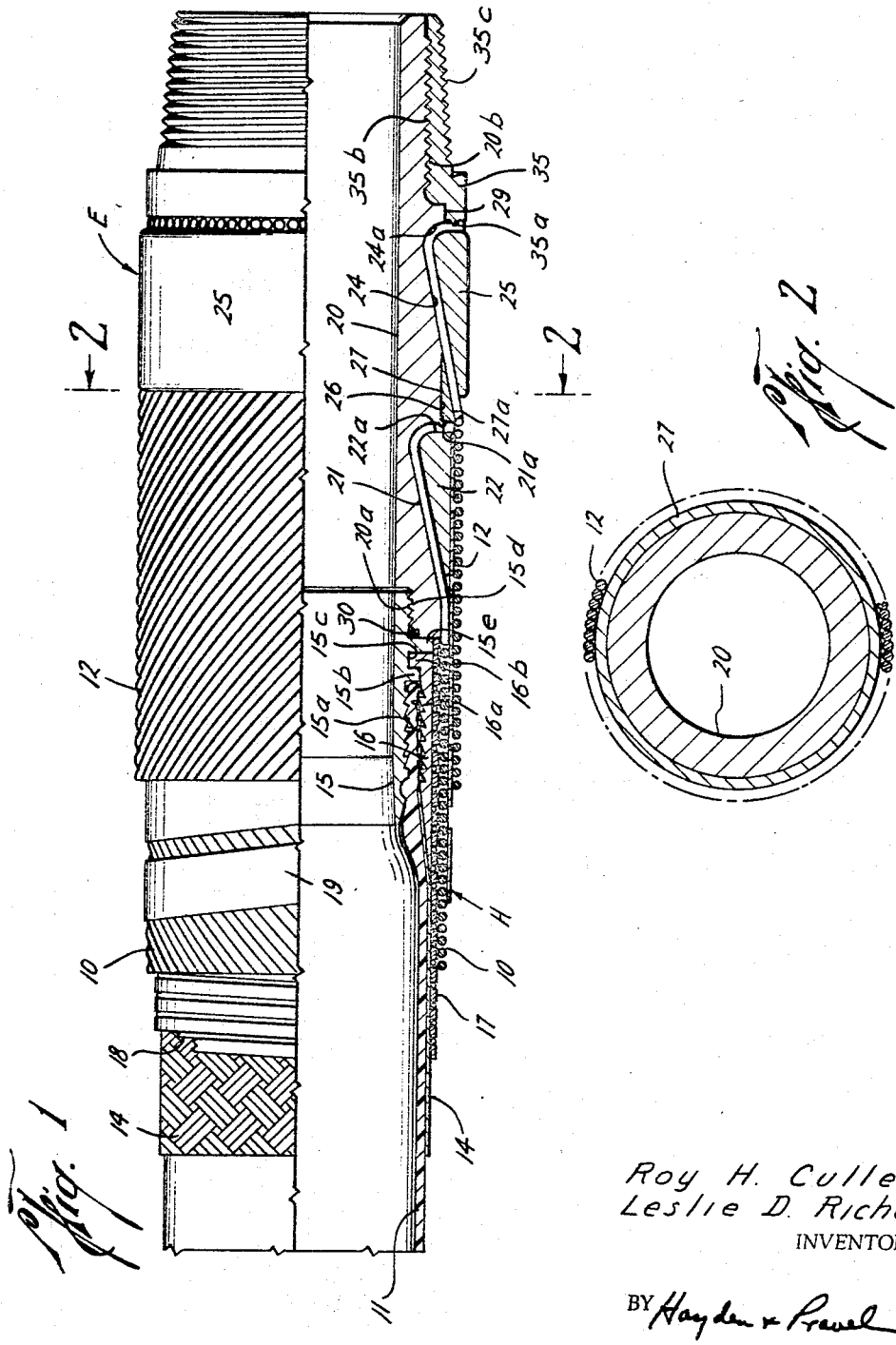
Roy H. Cullen
Leslie D. Richards
INVENTORS
BY Hayden & Prevel
ATTORNEYS United States Patent Office 3,276,794
Patented Oct. 4, 1966

3,276,794
HOSE END COUPLING
Roy H. Cullen, Suite 1931, 500 Jefferson Bldg., Houston, Tex., and Leslie D. Richards, Houston, Tex.; said Richards assignor to said Cullen
Filed June 15, 1964, Ser. No. 374,936
3 Claims. (Cl. 285—149)

This invention relates to new and useful improvements in end couplings for hose, and particularly end couplings for hose having plural layer wire reinforcing.

In our United States Patent No. 3,004,779, an end coupling for hose having plural layer wire reinforcing was disclosed. Such end coupling is particularly suitable for drilling hose wherein substantial end pulls and torque forces are applied to such hose.

An object of this invention is to provide a new and improved end coupling for hose having all of the advantages of the end coupling of said U.S. Patent No. 3,004,779, and additionally having certain other features and advantages.

An important object of this invention is to provide a new and improved end coupling wherein a single inner coupling body is adapted to be used in securely attaching thereto a plurality of wire reinforcing layers of a hose.

Another object of this invention is to provide a new and improved end coupling for hose having plural layer wire reinforcing externally of a hose core, wherein the construction of the coupling permits a maximum internal diameter of the coupling without sacrifice of necessary strength.

A particular object of this invention is to provide a new and improved end coupling for hose wherein an integral inner coupling body is provided with tapered sections, each of which receives the ends of a layer of a plurality of reinforcing wires, and wherein the inner coupling body has an annular surface between the tapered sections which is of approximately the same diameter as the inner diameter of the inner layer of wires when wrapped on the hose core, such annular surface being adapted to receive an annular wedge which has a maximum external diameter approximately equal to the inner diameter of the second layer of wires.

The preferred embodiment of this invention will be described hereinafter, together with other features thereof, and additional objects will become evident from such description.

The invention will be more readily understood from a reading of the following specification and by reference to the accompanying drawing forming a part thereof, wherein an example of the invention is shown, and wherein:

FIG. 1 is an elevation, partly in section, of the end coupling of this invention attached to a portion of hose having a plurality of wire layer reinforcing; and FIG. 2 is a sectional view taken on line 2—2 of FIG. 1 to illustrate further details of the invention.

In the drawing, the letter E designates generally the end coupling of this invention which as adapted to be connected to a hose H having a plurality of layers of wire reinforcing 10 and 12 therewith. The end coupling E of this invention is an improvement on the end coupling of United States Patent No. 3,004,779. The present end coupling E is unique in that it has a single integral inner coupling body 20 for receiving the ends of the wire reinforcing layers 10 and 12, as will be more fully explained. By reason of the construction of the end coupling E of this invention with such integral coupling body 20, a larger inside diameter for the end coupling E is possible as compared to the prior U.S. Patent No. 3,004,779. Also, the elimination of splines and other connecting means between separate coupling bodies is more dependable and economical. Furthermore, the use of the integral inner coupling body 20 is possible with the present construction even though both of the wire layers 10 and 12 are secured thereto, as will be more evident hereinafter.

Considering the invention more in detail, the hose H may take numerous forms, but in the present invention the host H is preferably a drilling hose and includes an inner tube or conductor 11 which is preferably made of synthetic rubber such as "neoprene," although it may be made of natural rubber or other suitable flexible material having sufficient strength to withstand the pressures and forces to which it is subjected in use. A wire braid sleeve 14 is disposed over the inner tube or conductor 11 and is preferably of the same length as the conductor 11. The conductor 11 and the wire braid 14 have their outer ends disposed between an inner nipple or attaching sleeve 15 and a clamping ring 16. As illustrated in the drawing, such nipple 15 and clamping ring 16 form a part of the end coupling E. The nipple 15 has buttress threads or serrations 15a annularly disposed on its external surface for gripping engagement with the interior of the hose tube or conductor 11. Similarly, the clamping ring 16 has buttress threads or serrations 16a on its inner surface for engagement with the external surface of the braid 14 of wire, rayon or the like and for embedding into the external surface of the tube or conductor 11. As will be more evident hereinafter, the clamping ring 16 is normally swaged into the gripping or clamping position illustrated in FIG. 1 of the drawing so as to confine and clamp the outward ends of the conductor 11 and the braid 14 between the clamping ring 16 and the nipple 15.

To prevent longitudinal displacement of the clamping ring 16 with respect to the nipple 15, the nipple 15 is provided with a shoulder 15b and a recess 15c. The clamping ring 16 has an inwardly extending annular projection 16b which fits into the groove or recess 15c when the clamping ring 16 has been swaged into its position as shown in FIG. 1.

The hose H as illustrated also preferably includes a helically wound spring steel coil 17 which has a filler cord 18 between the convolutions thereof. Such filler cord 18 is preferably an elastomer or a synthetic rubber and is wrapped in a coil conforming with the convolutions of the steel spring coil 17. The first or inner armor wire reinforcing layer 10 includes a plurality of steel wires, preferably galvanized which are disposed helically with a righthand twist as viewed from the righthand end of FIG. 1. In the normal hose construction used with the end coupling E of this invention, such inner layer 10 includes about one hundred fifteen wires.

A steel tape or band 19 is wrapped at a relatively steep angle around the first or inner layer of wires 10, although it may be omitted, if desired. The outer layer or second layer 12 of wires is also preferably of steel which may be provided with a protective coating or may be a stainless steel. Such layer 12 normally has approximately one hundred twenty-one wires wrapped in a helical direction which is lefthanded as viewed from the right side of FIG. 1. In other words, the wrapping of the wires in the layers 10 and 12 are in opposite directions. Usually the layer 12 of wires constitutes the outer surface of the hose H, although in some instances for protection or appearance, an outer sleeve of some other material may be employed.

The inner coupling body 20 of the end coupling E is formed with a first or inner annular tapered surface 21 which is adapted to receive one end of the layer 10 of reinforcing wires. Such wires in layer 10 are secured or firmly clamped to the coupling body 20 by an outer coupling ring 22 which is preferably swaged into the gripping and confining position illustrated in FIG. 1. It